United States Patent
Gao et al.

(10) Patent No.: US 11,553,492 B2
(45) Date of Patent: Jan. 10, 2023

(54) SLOT RESOURCE CONFIGURATION METHOD IN WIRELESS COMMUNICATION AND DEVICE

(71) Applicant: Huawei Technologies Co., Ltd., Shenzhen (CN)

(72) Inventors: Fei Gao, Shanghai (CN); Shurong Jiao, Shanghai (CN); Xiaolei Tie, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 131 days.

(21) Appl. No.: 16/716,270

(22) Filed: Dec. 16, 2019

(65) Prior Publication Data

US 2020/0120662 A1  Apr. 16, 2020

Related U.S. Application Data (63) Continuation of application No. PCT/CN2017/088488, filed on Jun. 15, 2017.

(51) Int. Cl.
*H04W 72/04* (2009.01)
*H04W 76/11* (2018.01)

(52) U.S. Cl.
CPC ....... *H04W 72/048* (2013.01); *H04W 72/042* (2013.01); *H04W 72/0446* (2013.01); *H04W 76/11* (2018.02)

(58) Field of Classification Search
CPC . H04W 76/11; H04W 72/048; H04W 72/042; H04W 72/0446
See application file for complete search history.

(56) References Cited

U.S. PATENT DOCUMENTS

| | | | | |
|---|---|---|---|---|
| 2013/0155992 A1* | 6/2013 | Yoon | ............... | H04L 5/0023 370/329 |
| 2014/0105164 A1* | 4/2014 | Moulsley | ......... | H04W 72/1289 370/329 |

(Continued)

FOREIGN PATENT DOCUMENTS

| | | |
|---|---|---|
| CA | 3067275 A1 | 12/2018 |
| CN | 102740477 A | 10/2012 |

(Continued)

OTHER PUBLICATIONS

"3rd Generation Partnership Project; Technical Specification Group Radio Access Network; NR; Multiplexing and channel coding (Release 15)," 3GPP TS 38.212 V0.0.0, pp. 1-10, 3rd Generation Partnership Project, Valbonne, France (May 2017).

(Continued)

*Primary Examiner* — Siming Liu
(74) *Attorney, Agent, or Firm* — Leydig, Voit & Mayer, Ltd.

(57) ABSTRACT

A slot resource configuration method in wireless communication and a device are provided, to resolve a problem of how to configure a flexible resource included in a new slot structure. In this method, user equipment-specific downlink control information (UE-specific DCI) sent by a base station is received, where the UE-specific DCI indicates a use configuration status of a flexible resource in at least one slot; and the flexible resource is configured according to the use configuration status. This method implements configuration of a flexible resource, so that the flexible resource can be used for communication, thereby improving slot resource usage.

14 Claims, 6 Drawing Sheets

(56) References Cited

U.S. PATENT DOCUMENTS

| | | | |
|---|---|---|---|
| 2014/0161034 A1* | 6/2014 | Han | H04W 72/1289 370/328 |
| 2014/0198733 A1* | 7/2014 | Yin | H04L 1/1812 370/329 |
| 2014/0198746 A1* | 7/2014 | Ahn | H04L 5/0053 370/329 |
| 2015/0092768 A1* | 4/2015 | Ng | H04J 11/0069 370/350 |
| 2015/0223208 A1* | 8/2015 | Park | H04W 4/06 370/329 |
| 2015/0271790 A1* | 9/2015 | Lee | H04W 72/042 455/450 |
| 2017/0170940 A1 | 6/2017 | Lee et al. | |
| 2018/0020375 A1* | 1/2018 | Matsumoto | H04W 84/12 |
| 2018/0124773 A1* | 5/2018 | Lee | H04L 5/0053 |
| 2018/0219648 A1 | 8/2018 | Kim et al. | |
| 2018/0262319 A1 | 9/2018 | Xing et al. | |
| 2018/0368173 A1* | 12/2018 | Shaheen | H04W 72/14 |
| 2019/0058516 A1* | 2/2019 | Yang | H04B 7/0626 |
| 2019/0116608 A1* | 4/2019 | Kim | H04W 72/1263 |
| 2019/0215831 A1* | 7/2019 | Baldemair | H04W 72/0446 |
| 2019/0387501 A1* | 12/2019 | Park | H04L 5/005 |
| 2020/0077429 A1 | 3/2020 | Ma et al. | |

FOREIGN PATENT DOCUMENTS

| | | | |
|---|---|---|---|
| CN | 103298117 A | 9/2013 | |
| CN | 104919849 A | 9/2015 | |
| CN | 106413105 A | 2/2017 | |
| CN | 106455092 A | 2/2017 | |
| CN | 108809582 A | 11/2018 | |
| CN | 109152020 A | 1/2019 | |
| WO | 2015126191 A1 | 8/2015 | |
| WO | 2015190663 A1 | 12/2015 | |
| WO | 2016131352 A1 | 8/2016 | |
| WO | 2017022960 A1 | 2/2017 | |

OTHER PUBLICATIONS

"Discussion on DCI Contents for NR," 3GPP TSG RAN WG1 Meeting #89, Hangzhou, China, R1-1708399, pp. 1-8, 3rd Generation Partnership Project, Valbonne, France (May 15-19, 2017).

"On Data Transmission in Control Resource Sets," 3GPP TSG-RAN WG1 Meeting#89, Hangzhou, China, R1-1709071, pp. 1-5, 3rd Generation Partnership Project, Valbonne, France (May 15-19, 2017).

"On PUSCH enhancements for URLLC," 3GPP TSG RAN WG1 Meeting #99, Reno, Nevada, USA, R1-1912216, pp. 1-8, 3rd Generation Partnership Project, Valbonne, France (Nov. 18-22, 2019).

LG Electronics, "Discussion on UE behaviour for the group common PDCCH," 3GPP TSG RAN WG1 Meeting #89 Hangzhou, China, R1-1707635, total 6 pages, 3rd Generation Partnership Project, Valbonne, France (May 15-19, 2017).

* cited by examiner

SLOT RESOURCE CONFIGURATION METHOD IN WIRELESS COMMUNICATION AND DEVICE

CROSS-REFERENCE TO RELATED APPLICATIONS

This application is a continuation of International Application No. PCT/CN2017/088488, filed on Jun. 15, 2017, the disclosure of which is hereby incorporated by reference in its entirety.

TECHNICAL FIELD

Embodiments of this application relate to the wireless communication technical field, and in particular, to a slot resource configuration method in wireless communication and a device.

BACKGROUND

In a conventional long term evolution (LTE) system, frequency division duplex (FDD) and time division duplex (TDD) are supported. An FDD-LTE system uses a pair of symmetric frequency bands to transmit and receive uplink (UL) and downlink (DL) data, namely, UL data transmission and DL data transmission are separated by frequency domain. In each 10 millisecond (ms) system frame, there are 10 subframes. Each subframe includes two 0.5 ms slots, and each slot includes seven symbols or 14 symbols. The seven symbols or the 14 symbols are all used to transmit UL data or receive DL data. A TDD-LTE system transmits UL data and receive DL data on different slots of a same frequency band, namely, UL data transmission and DL data transmission are separated by time domain. In the TDD-LTE system, a resource configuration method for slots in subframes other than a special subframe is the same as that in the FDD-LTE system.

In a fifth-generation new radio (5G NR) system, a new slot structure is proposed, where the new slot structure includes a flexible resource. How to configure the flexible resource for communication is a problem that needs to be resolved.

SUMMARY

Embodiments of this application provide a slot resource configuration method in wireless communication and a device to configure a flexible resource in a new slot structure, improving slot resource utilization.

According to a first aspect, an embodiment of this application further provides a slot resource configuration method in wireless communication. The method includes: receiving, by user equipment (UE), UE-specific downlink control information (UE-specific DCI) sent by a base station, where the UE-specific DCI is used to indicate a use configuration status of a flexible resource in at least one slot; and configuring, by the UE, the flexible resource according to the use configuration status.

According to the foregoing method, the UE may configure the flexible resource according to the received UE-specific DCI, and communicate with the base station by using the configured flexible resource, so that slot resource utilization can be improved to some extent.

In a possible design, the UE-specific DCI includes use flag information used to indicate the use configuration status; and the method further includes: determining the use configuration status according to the use flag information.

According to the foregoing method, a new field may be introduced into the UE-specific DCI, and the new field is used to indicate the use flag information of the use configuration status.

In a possible design, a time-frequency resource location in which the UE-specific DCI is located is used to indicate the use configuration status; and the method further includes: determining the use configuration status according to the time-frequency resource location.

In a possible design, the UE-specific DCI is scrambled by using an identifier used to indicate the use configuration status; and the method further includes: determining the use configuration status according to the identifier.

In a possible design, the use configuration status is a use-disabled state; and the configuring the flexible resource according to the use configuration status includes: configuring, according to the use-disabled state, the UE to be prohibited from performing communication by using the flexible resource, where the communication is scheduled by the UE-specific DCI.

According to the foregoing method, when the use configuration status received by the UE is the use-disabled state, the UE is prohibited from transmitting, by using the flexible resource, data scheduled by the UE-specific DCI.

In a possible design, the use configuration status is a use-enabled state; and the configuring the flexible resource according to the use configuration status includes: configuring, according to the use-enabled state, to perform communication with the base station on the flexible resource, where the communication is scheduled by the UE-specific DCI.

According to the foregoing method, when the use configuration status received by the UE is the use-enabled state, when performing transmission with the base station, the UE needs to use the flexible resource to communicate the data scheduled by the UE dedicated DCI.

In a possible design, the UE-specific DCI includes scheduling information, used to indicate that the flexible resource is an UL resource; and the configuring to perform communication with the base station on the flexible resource includes: configuring to send UL data to the base station on the flexible resource.

In a possible design, the UE-specific DCI includes scheduling information, used to indicate that the flexible resource is a DL resource; and the configuring to perform communication with the base station on the flexible resource includes: configuring to receive DL data from the base station on the flexible resource.

In a possible design, the method further includes: determining, according to a configuration from the base station or a pre-specification in a protocol, that a DL reference signal (RS) exists in the DL resource; and the configuring to receive DL data from the base station on the flexible resource includes: configuring to receive the DL RS from the base station on the flexible resource.

In a possible design, the method further includes: determining a length and a location of a guard period (GP) in the flexible resource according to the configuration from the base station; and the configuring to perform communication with the base station on the flexible resource includes: configuring to perform communication with the base station on another resource other than the GP in the flexible resource.

In a possible design, the at least one slot is a plurality of slots in aggregated slots.

The foregoing method is applicable to a case in which a terminal device supports slot aggregation.

In a possible design, the plurality of slots are a plurality of consecutive slots.

In a possible design, the UE-specific DCI is located in one slot of the plurality of slots in time domain; or the UE-specific DCI is located in a slot that precedes the plurality of slots in time domain.

In a possible design, the UE-specific DCI includes aggregated slot quantity information and the use flag information used to indicate the use configuration status; and the use flag information is used to indicate use configuration statuses of all or some slots in the aggregated slots.

In a possible design, the UE-specific DCI includes the use flag information used to indicate the use configuration status, and the use flag information may further indicate a quantity of aggregated slots and use configuration statuses of all or some slots in the aggregated slots.

In a possible design, the method further includes: receiving higher layer signaling from the base station, and determining, according to the higher layer signaling, that the aggregating slots is supported; or reporting, to the base station, capability information indicating that the aggregating slots is supported.

According to a second aspect, this application provides a slot resource configuration method in wireless communication. The method includes: generating, by a base station, UE-specific DCI, where the UE-specific DCI is used to indicate a use configuration status of a flexible resource in at least one slot, and the use configuration status is used by UE to configure the flexible resource; and sending the UE-specific DCI to the UE.

According to the foregoing method, the base station generates the UE-specific DCI for configuring the flexible resource, and the UE may configure the flexible resource by using the UE-specific DCI, and communicate with the base station by using the configured flexible resource, so that slot resource utilization can be improved to some extent.

In a possible design, the UE-specific DCI includes use flag information used to indicate the use configuration status, and the use flag information is used to determine the use configuration status.

In a possible design, a time-frequency resource location in which the UE-specific DCI is located is used to indicate the use configuration status.

In a possible design, the UE-specific DCI is scrambled by using an identifier used to indicate the use configuration status; and the identifier is used to determine the use configuration status.

In a possible design, the use configuration status is a use-disabled state, and the use-disabled state is used to indicate that the UE is prohibited from performing communication on the flexible resource.

In a possible design, the use configuration status is a use-enabled state, and the use-enabled state is used to indicate that the UE is configured to perform communication with a base station on the flexible resource.

In a possible design, the UE-specific DCI includes scheduling information, used to indicate that the flexible resource is an UL resource.

In a possible design, the UE-specific DCI includes scheduling information, used to indicate that the flexible resource is a DL resource.

In a possible design, the method further includes: determining, according to a configuration or a pre-specification in a protocol, that a DL RS exists in the DL resource; and sending the DL RS to the UE on the flexible resource.

In a possible design, the method further includes: sending configuration information used to determine a length and a location of a GP in the flexible resource, where the configuration information of the GP length and location is used to indicate the UE to configure another resource other than the GP in the flexible resource to communicate with the base station.

In a possible design, the at least one slot is a plurality of slots in aggregated slots.

In a possible design, the plurality of slots are a plurality of consecutive slots.

In a possible design, the UE-specific DCI is located in one slot of the plurality of slots in time domain; or the UE-specific DCI is located in a slot that precedes the plurality of slots in time domain.

In a possible design, the UE-specific DCI includes aggregated slot quantity information and the use flag information used to indicate the use configuration status; and the use flag information is used to indicate use configuration statuses of all or some slots in the aggregated slots.

In a possible design, the UE-specific DCI includes the use flag information used to indicate the use configuration status, and the use flag information may further indicate a quantity of aggregated slots and use configuration statuses of all or some slots in the aggregated slots.

In a possible design, the method further includes: sending higher layer signaling to indicate that the UE supports the aggregating slots; or receiving capability information that is reported by the UE and indicates that the aggregating slots is supported.

According to a third aspect, this application provides UE. The UE has a function of implementing behavior of the UE in the foregoing method example in the first aspect. The function may be implemented by hardware, or may be implemented by hardware by executing corresponding software. The hardware or the software includes one or more modules corresponding to the function.

In a possible design, a structure of the terminal device includes a processing unit and a transceiver unit. These units can execute corresponding functions in the foregoing method example. For details, refer to the detailed descriptions in the method example. Details are not described herein again.

According to a fourth aspect, this application provides a base station. The base station has a function of implementing behavior of the base station in the foregoing method example in the second aspect. The function may be implemented by hardware, or may be implemented by hardware by executing corresponding software. The hardware or the software includes one or more modules corresponding to the function.

In a possible design, a structure of the base station includes a processing unit and a transceiver unit. These units can execute corresponding functions in the foregoing method example. For details, refer to the detailed descriptions in the method example. Details are not described herein again.

According to a fifth aspect, an embodiment of this application further provides UE. The UE includes a processor, a memory, and a transceiver. The memory is configured to store a software program, and the processor is configured to read the software program stored in the memory and implement the method provided in any one of the first aspect or the designs of the first aspect.

According to a sixth aspect, an embodiment of this application further provides a base station. The base station includes a processor, a memory, and a transceiver. The memory is configured to store a software program, and the processor is configured to read the software program stored in the memory and implement the method provided in any one of the second aspect or the designs of the second aspect.

According to a seventh aspect, an embodiment of this application further provides a computer storage medium. The storage medium stores a software program. When being read and executed by one or more processors, the software program may implement the method according to any one of the first aspect or the designs of the first aspect.

According to an eighth aspect, an embodiment of this application further provides a computer storage medium. The storage medium stores a software program. When being read and executed by one or more processors, the software program may implement the method according to any one of the second aspect or the designs of the second aspect.

DESCRIPTION OF EMBODIMENTS

The following further describes in detail the embodiments of this application with reference to the accompanying drawings.

Embodiments of this application provide a slot resource configuration method in wireless communication and UE, to resolve a problem of how to configure a flexible resource included in a new slot structure. In this application, the method and the UE are according to a same inventive concept. Because the method and the UE have similar problem-resolving principles, reference may be mutually made to implementations of the UE and the method. No repeated description is provided.

Figure 1:
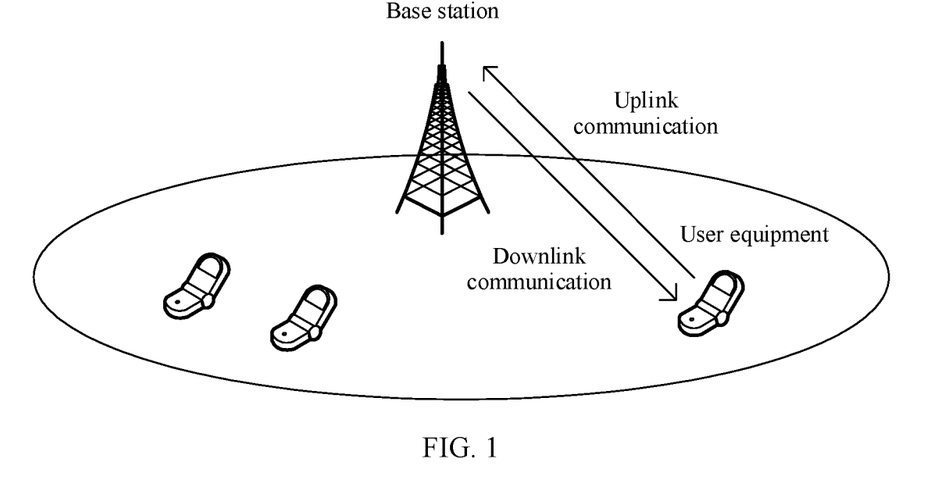
FIG. 1 is a diagram of a communication application scenario according to an embodiment of this application.

An application scenario of the embodiments of this application is communication between a base station and UE. As shown in FIG. 1, the base station may perform UL communication or DL communication with at least one UE in a cell served by the base station. The UL communication is communication from the UE to the base station, and includes UL sending of the UE and UL receiving of the base station. The DL communication is communication from the base station to the UE, and includes DL receiving of the UE and DL sending of the base station. The base station includes, but is not limited to, various stations providing wireless communication coverage services, for example, a base station subsystem, a base station controller, a Node B, an eNode B, a relay node, a pico cell, a femto cell, or a 5G gNodeB. The UE may also be referred to as a user terminal, an access terminal, a mobile station, or the like, and uses a service provided by the base station. A specific form of the UE may be, for example, a smartphone, a functional mobile phone, a wearable device, a data card, a tablet computer, a fixed terminal, an internet of things device, a home networking device, or a notebook computer.

Figure 2:
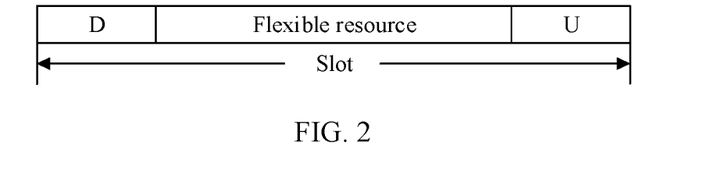
FIG. 2 is a structural diagram of a slot according to an embodiment of this application.

In a newly proposed NR system, a slot structure of each frame is shown in FIG. 2, and is divided into a fixed DL resource (D for short), a flexible resource (Flexible for short), and a fixed UL resource (U for short). UE receives higher layer signaling sent by a base station, and semi-statically configures a flexible resource of a slot. The base station dynamically configures an UL/DL transmission direction of the flexible resource by sending UE-specific DCI to the UE.

Figure 3:
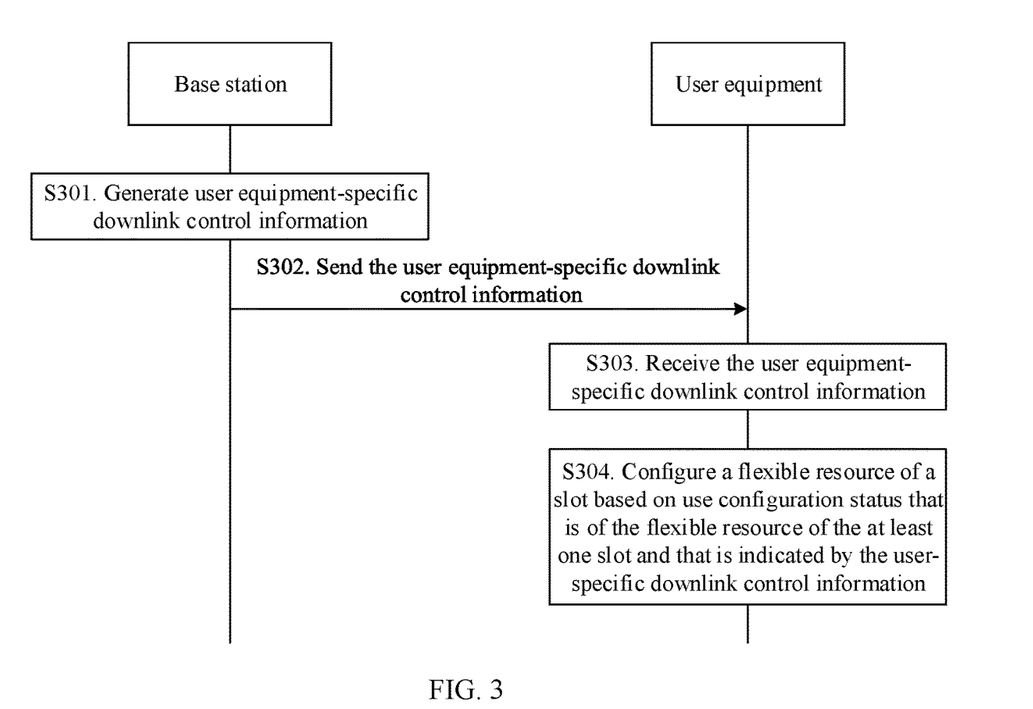
FIG. 3 is a flowchart of a slot resource configuration method in wireless communication according to an embodiment of this application.

An embodiment of this application provides a slot resource configuration method in wireless communication. When UE does not support slot aggregation, as shown in FIG. 3, a specific procedure of the method includes the following steps.

S301. A base station generates UE-specific DCI. The UE-specific DCI is used to indicate a use configuration status of a flexible resource of one slot.

Optionally, the use configuration status may be determined in three manners.

Manner 1: The UE-specific DCI includes use flag information used to indicate the use configuration status, and the use configuration status is determined according to the use flag information. Specifically, the use flag information is a field added to the UE-specific DCI. For example, the UE-specific DCI is 20 bits+1 bit, where the 20 bits are bits occupied by another piece of control information, and the 1 bit is the use flag information. The use flag information is used to indicate whether the flexible resource is used or not used, where 1 indicates that the flexible resource is used, and 0 indicates that the flexible resource is not used; alternatively, 1 indicates that the flexible resource is not used, and 0 indicates that the flexible resource is used. This is not limited in the present application. Namely, the use configuration status is "disabled" or "enabled". When the use configuration status is "disabled", the UE is prohibited from using the flexible resource to perform communication, with the base station, data scheduled by the UE-specific DCI. When the use configuration status is "enabled", the UE uses the flexible resource to perform communicating, with the base station, data scheduled by the UE-specific DCI.

Descriptions are provided by using examples. Example 1: The UE-specific DCI is used to schedule data of an enhanced mobile broadband (eMBB) service, or schedule data of an ultra-reliable low-latency communication (URLLC) service, or schedule data of another service. When the UE-specific DCI is used to schedule data of an eMBB service, and the use configuration status of the flexible resource is disabled, the data of the eMBB service is prohibited from being transmitted on the flexible resource, but the user is not prohibited from transmitting, on the flexible resource, data of a URLLC service scheduled by another piece of UE-specific DCI. Similarly, when the UE-specific DCI is used to schedule data of a URLLC service, and the use configuration status of the flexible resource is disabled, the data of the URLLC service is prohibited from being transmitted on the flexible resource, but the user is not prohibited from transmitting, on the flexible resource, data of an eMBB service scheduled by another piece of UE-specific DCI. Example 2: When the use configuration status of the flexible resource is disabled, the UE is prohibited from transmitting, on the flexible resource, data corresponding to any service scheduled by the UE-specific DCI, but the UE is not prohibited from sending or receiving a RS on the flexible resource.

Manner 2: A time-frequency resource location at which the UE-specific DCI is located is used to indicate the use configuration status. The use configuration status is determined according to the time-frequency resource location. Whether the flexible resource is used or not used, namely, whether the use configuration status is disabled or enabled, is indicated according to the time-frequency resource location. When the use configuration status is disabled, the UE is prohibited from performing communication with the base station on the flexible resource. When the use configuration status is enabled, the UE performs communication with the base station on the flexible resource.

Figure 4:
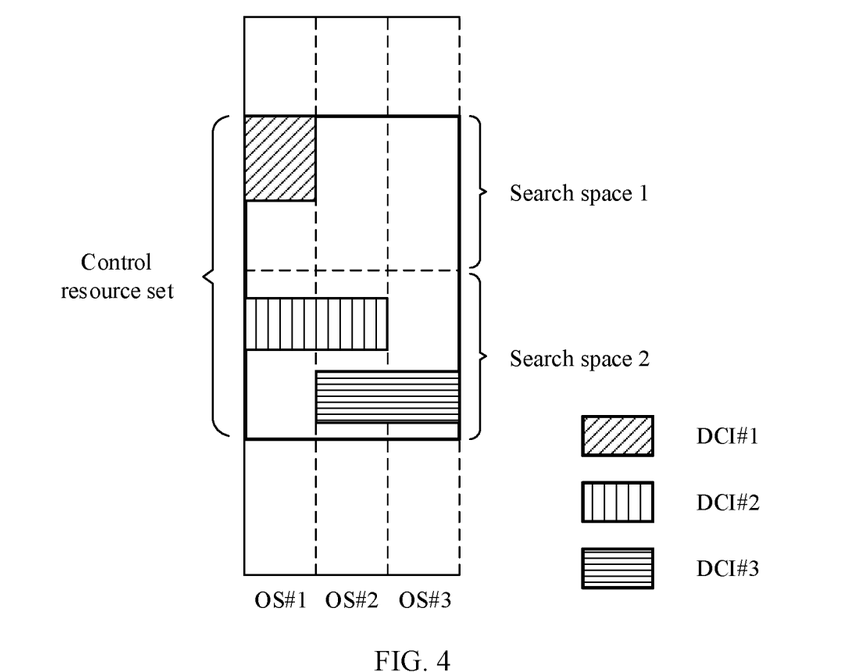
FIG. 4 is a schematic diagram of a search space according to an embodiment of this application.

For example, one control resource set (CORESET) includes a plurality of search spaces, and each search space includes a plurality of pieces of UE-specific DCI. As shown in FIG. 4, two search spaces are included, and OS represents an orthogonal frequency division multiplexing (OFDM) symbol. In a possible case, if the UE-specific DCI in the CORESET starts from the first OFDM symbol in the time domain, it indicates that the flexible resource is used. For example, data scheduled by UE-specific DCI #1 and UE-specific DCI #2 that are in FIG. 4 is transmitted on the flexible resource, but data scheduled by UE-specific DCI #3 is prohibited from being transmitted on the flexible resource. In another possible case, data scheduled by UE-specific DCI in a search space 1 is prohibited from being transmitted on the flexible resource, and data scheduled by UE-specific DCI in a search space 2 is transmitted on the flexible resource. For example, data scheduled by the UE-specific DCI #1 in FIG. 4 is prohibited from being transmitted on the flexible resource, and data scheduled by the UE-specific DCI #2 and data scheduled by the UE-specific DCI #3 are transmitted on the flexible resource.

Manner 3: The UE-specific DCI is scrambled by using an identifier used to indicate the use configuration status, and the use configuration status is determined according to the identifier. Whether the flexible resource is used or not used, namely, whether the use configuration status is disabled or enabled, is indicated according to a scrambling code. When the use configuration status is disabled, the UE is prohibited from performing communication with the base station on the flexible resource. When the use configuration status is enabled, the UE performs communication with the base station on the flexible resource.

Figure 5:
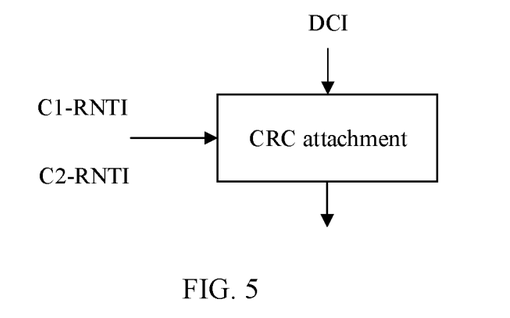
FIG. 5 is a schematic diagram of a scrambling code according to an embodiment of this application.

For example, as shown in FIG. 5, the base station allocates, to each UE, two cell radio network temporary identifiers (C-RNTI), namely, a C1-RNTI and a C2-RNTI, to distinguish between different UEs in a cell. The C1-RNTI indicates that the flexible resource is used, and the C2-RNTI indicates that the flexible resource is not used. The base station implicitly encodes the C1-RNTI or the C2-RNTI into a cyclic redundancy check (CRC). The UE performs blind detection on a DCI format corresponding to the C1-RNTI or the C2-RNTI in a search space, to determine whether to use or not to use the flexible resource.

S302: The base station sends the UE-specific DCI.

S303. The UE receives the UE-specific DCI.

S304. The UE configures a flexible resource of at least one slot according to a use configuration status that is of the flexible resource of the at least one slot and that is indicated by the user-specific DCI.

In this embodiment of this application, for example, the UE may configure a flexible resource of each slot according to received UE-specific DCI for a plurality of slots, and communicate with the base station on a configured flexible resource. Therefore, slot resource utilization can be improved to some extent.

In a possible implementation, after S304, if the UE configures to use the flexible resource, the UE determines a direction of the flexible resource according to scheduling information included in the UE-specific DCI. If the scheduling information is UL DCI, the flexible resource is an UL resource, the UL resource is used to send data to the base station, and the UE sends data to the base station on the fixed UL resource and the flexible resource. If the scheduling information is DL DCI, the flexible resource is a DL resource, and the UE determines that the DL resource is used to receive data sent by the base station, and receives, on the fixed DL resource and the flexible resource, the data sent by the base station. Alternatively, in the UE-specific DCI, a 1-bit field is used to indicate that the flexible resource is an UL resource or a DL resource.

If the UE configures not to use the flexible resource, the UE sends data to the base station on the fixed UL resource, and receives, on the fixed DL resource, data sent by the base station.

In a possible implementation, it is determined, according to a configuration from the base station or a pre-specification in a protocol, that a DL RS exists in the DL resource; and the configuring the UE to receive DL data from the base station on the flexible resource includes: configuring the UE to receive the DL RS from the base station on the flexible resource.

Specifically, the UE configures, according to a length of the fixed DL resource, a length of the flexible resource, a symbol location of a DL RS that is semi-statically configured by the base station, and the use configuration status of the flexible resource, the DL RS.

If the UE determines, according to the use configuration status, not to use the flexible resource, whether the flexible resource includes a DL RS does not need to be determined for scheduling of the UE. If the UE determines, according to the use configuration status, to use the flexible resource, whether the flexible resource is an UL resource or a DL resource is determined; and if the flexible resource is an UL resource, the flexible resource definitely does not include a DL RS, and therefore, whether the flexible resource includes a DL RS does not need to be determined.

Figure 6:
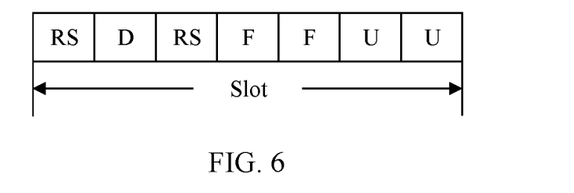
FIG. 6 is a structural diagram of another slot according to an embodiment of this application.

If the flexible resource is a DL resource, whether at least one DL RS is all in the fixed DL resource is further determined, and if the at least one DL RS is all in the fixed DL resource, the UE determines that no DL RS exists in the flexible resource. For example, it is assumed that one slot includes seven symbols, where a fixed DL resource occupies three symbols, a flexible resource occupies two symbols, a fixed UL resource occupies two symbols, and the DL RSs are on the first symbol and the third symbol. As shown in FIG. 6, the DL RSs are all in the fixed DL resource, and no DL RS exists in the flexible resource. Therefore, the UE does not need to determine whether the flexible resource includes the DL RS.

Figure 7:
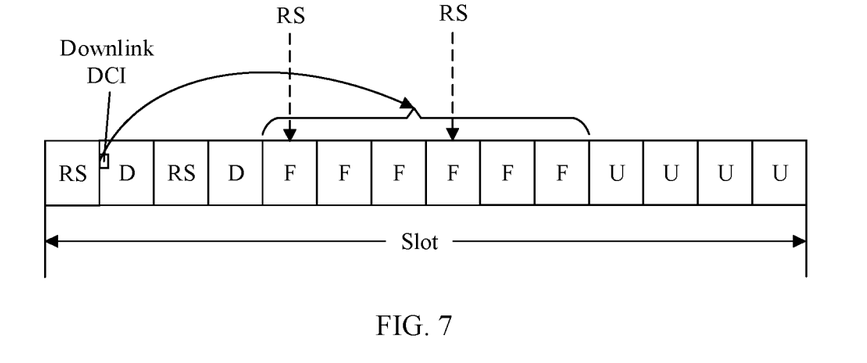
FIG. 7 is a structural diagram of still another slot according to an embodiment of this application.

If the at least one DL RS is not all in the fixed DL resource, the UE determines, according to a length of the fixed DL resource, a length of the flexible resource, and a symbol location of a DL RS that is semi-statically configured by the base station, a location of a DL RS in the flexible resource. For example, it is assumed that one slot includes 14 symbols, where a fixed DL resource occupies four symbols, a flexible resource occupies six symbols, a fixed UL resource occupies four symbols, and the DL RSs are on the first, third, fifth, and eighth symbols. As shown in FIG. 7, the first and third symbols of the DL RSs are in the fixed DL resource, and the fifth and eighth symbols are in the flexible resource. For the flexible resource, the DL RSs are on the first and fourth symbols, and the DL DCI may be sent on the second symbol of the slot.

In a possible implementation, a length and a location of a GP in the flexible resource is determined according to the configuration from the base station; and the configuring the UE to perform communication with the base station on the flexible resource includes: configuring the UE to perform communication with the base station on another resource other than the GP in the flexible resource.

Figure 8:
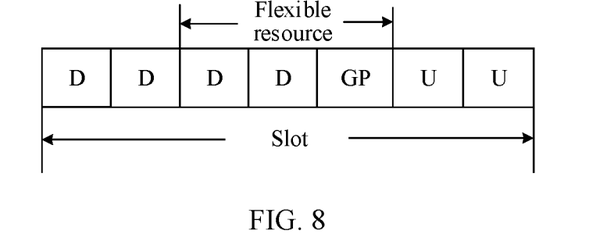
FIG. 8 is a structural diagram of yet another slot according to an embodiment of this application.
Figure 9:
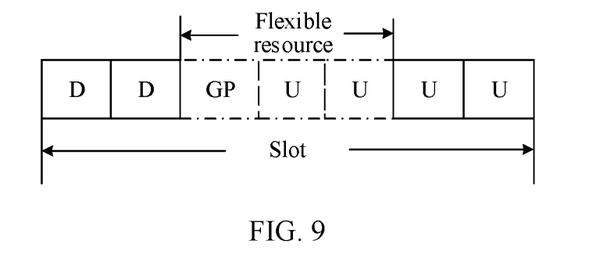
FIG. 9 is a structural diagram of still yet another slot according to an embodiment of this application.

Specifically, the UE determines the length and the location of the GP according to a length of a GP, the length of the flexible resource, the use configuration status of the flexible resource, and a direction of the scheduling information included in the UE-specific DCI that are statically configured by the base station. Descriptions are provided by using examples. Example 1: The base station semi-statically configures one slot including seven symbols, where the fixed DL resource and the fixed UL resource each occupy two symbols, the flexible resource occupies three symbols, and the GP is semi-statically configured as one symbol. When the UE detects that the use flag information of the flexible resource is 1, where 1 indicates that the flexible resource is used, and 0 indicates that the flexible resource is not used, and the UE-specific DCI for scheduling of the slot is DL DCI, a structure of the flexible resource of the slot is that a GP symbol is after a DL symbol. As shown in FIG. 8, in the flexible resource, a DL occupies two symbols, and the GP occupies one symbol. Example 2: The base station semi-statically configures one slot including seven symbols, where the fixed DL resource and the fixed UL resource each occupy two symbols, the flexible resource occupies three symbols, and the GP is semi-statically configured as one symbol. When the UE detects that the use flag information of the flexible resource is 1, where 1 indicates that the flexible resource is used, and 0 indicates that the flexible resource is not used, and the UE-specific DCI for scheduling of the slot is UL DCI, a structure of the flexible resource of the slot is that a UL symbol is after a GP symbol. As shown in FIG. 9, in the flexible resource, the GP occupies one symbol, and a UL occupies two symbols.

In another possible implementation, the UE supports slot aggregation. To be specific, the UE supports aggregation of a plurality of consecutive slots, to obtain aggregated slots. The first slot of the aggregated slots or a slot preceding the aggregated slots carries UE-specific DCI, which is used to configure flexible resources of a plurality of slots in the aggregated slots. The UE receives higher layer signaling from the base station, and determines to support the aggregating slots by using the higher layer signaling; or the UE reports, to the base station, capability information indicating that the aggregating slots is supported.

Figure 10:
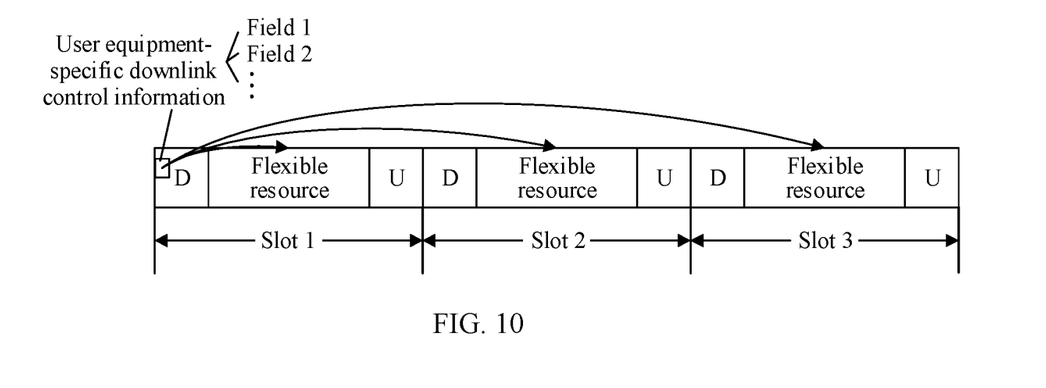
FIG. 10 is a structural diagram of a further slot according to an embodiment of this application.
Figure 11:
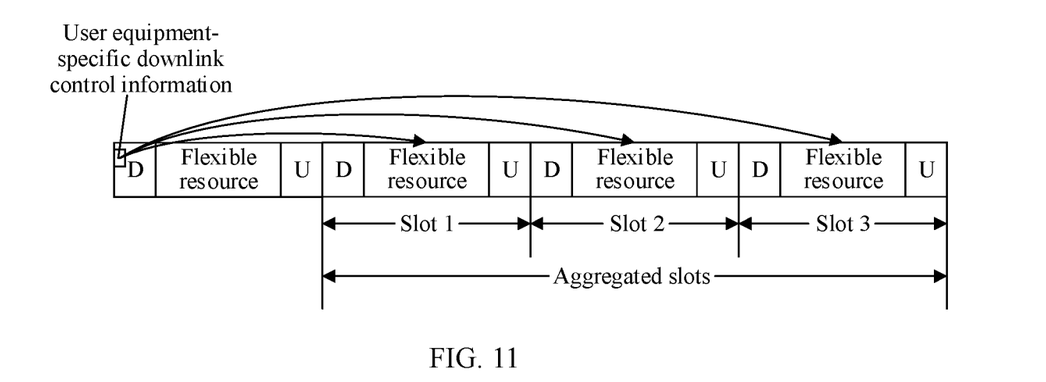
FIG. 11 is a structural diagram of a yet further slot according to an embodiment of this application.

For example, as shown in FIG. 10, the UE aggregates three slots. The UE-specific DCI is carried in a slot 1, and is used to configure flexible resources of the slot 1, a slot 2, and a slot 3. As shown in FIG. 11, the UE aggregates three slots. The UE-specific DCI is carried in a slot preceding a slot 1, and is used to configure flexible resources of the slot 1, a slot 2, and a slot 3. This is cross-slot scheduling.

In a possible implementation, the UE-specific DCI includes different fields, where one field is used to indicate aggregated slot quantity information, and another field is used to indicate use flag information of the use configuration status, namely, independent encoding; and the aggregated slot quantity information occupies two bits, and is represented by $a_1a_0$. The use flag information of flexible resources in aggregated slots occupies three bits, and is represented by $b_2b_1b_0$. Alternatively, the field is use flag information used to indicate the use configuration status, and the use flag information can further indicate a quantity of aggregated slots and use configuration status of all or some slots in the aggregated slots, namely, joint encoding. According to different encoding schemes, the UE-specific DCI may be 20 bits+5 bits, 20 bits+4 bits, 20 bits+3 bits, or 20 bits+2 bits, where 5 bits, 4 bits, 3 bits, or 2 bits are used to indicate the encoding schemes, which specifically include the following six cases:

Case 1: Use configuration statuses of the plurality of flexible resources are all enabled, some enabled, or all disabled, and independent encoding is applied on aggregated slot quantity information and use flag information. When a maximum quantity of aggregated slots is 3, the aggregated slot quantity information occupies two bits, and is represented by $a_1a_0$. The use flag information of the flexible resources in the aggregated slots occupies three bits, and is represented by $b_2b_1b_0$. Table 2 shows their mapping relationship, where "Y" indicates enabled, "N" indicates disabled, and "(Not available) N/A" indicates not available. In Table 1, $a_1a_0$ and $b_2b_1b_0$ are in a one-to-one correspondence, and are not limited to a sequence in the table. For example, when $a1a0=10$, $b_2b_1b_0=000$ represents "Y Y Y", and $b_2b_1b_0=001$ represents "Y Y N". Alternatively, $b_2b_1b_0=001$ represents "Y Y Y", and $b_2b_1b_0=000$ represents "Y Y N", where 1/0 indicates enabled/disabled, or 0/1 indicates enabled/disabled. This is not limited in the embodiments of the present application. In Table 1, when $a_1a_0=00$, it indicates that there is a single slot. A user decodes only the first bit $b_2$ of the use flag information $b_2b_1b_0$ that is of the flexible resources in the aggregated slots and that is in the UE-specific DCI, and determines, according to the mapping relationship in Table 1, whether a flexible resource in a slot corresponding to the bit is used. When $a_1a_0=01$, it indicates that two slots are aggregated. A user decodes only the first two bits $b_2b_1$ of the use flag information of the flexible resources in the aggregated slots, and determines, according to the mapping relationship in Table 1, whether a flexible resource in a slot corresponding to the bit is used. When $a_1a_0=10$, it indicates that three slots are aggregated. A user decodes all three bits $b_2b_1b_0$, and determines, according to the mapping relationship in Table 1, whether a flexible resource in a slot corresponding to the bit is used. In Table 1, all bits indicating "N/A" are 0s, or may be 1s, or may not be specified.

TABLE 1

| Quantity of aggregated slots | Aggregated slot quantity information $a_1a_0$ | Whether flexible resources of aggregated slots are used | | | Use flag information $b_2b_1b_0$ of flexible resources of aggregated slots |
|---|---|---|---|---|---|
| | | 1 | 2 | 3 | |
| 1 | 00 | Y | N/A | N/A | 000 |
| | | N | N/A | N/A | 100 |
| 2 | 01 | Y | Y | N/A | 000 |
| | | Y | N | N/A | 010 |
| | | N | N | N/A | 100 |
| | | N | N | N/A | 110 |
| 3 | 10 | Y | Y | Y | 000 |
| | | Y | Y | N | 001 |
| | | Y | N | Y | 010 |
| | | Y | N | N | 011 |
| | | N | Y | Y | 100 |
| | | N | Y | N | 101 |
| | | N | N | Y | 110 |
| | | N | N | N | 111 |

Case 2: Use configuration statuses of the plurality of flexible resources are all enabled, some enabled, or all disabled, and joint encoding is applied on a quantity of aggregated slots and use configuration statuses of the flexible resources in the aggregated slots. When a maximum quantity of aggregated slots is 3, use flag information occupies four bits, represented by $b_3b_2b_1b_0$. All possibilities of the quantity of aggregated slots and whether the flexible resources in the aggregated slots are used are represented by the four bits. Table 2 shows their mapping relationship, where "Y" indicates enabled, "N" indicates disabled, and "N/A" indicates not available. In Table 2, 14 possibilities of whether the flexible resources of the aggregated slots are used are in a one-to-one correspondence with $b_3b_2b_1b_0$, but are not limited to a sequence in the table. For example, $b_3b_2b_1b_0=0110$ represents "Y Y Y", and $b_3b_2b_1b_0=0111$ represents "Y Y N". Alternatively, $b_3b_2b_1b_0=0111$ represents "Y Y Y", and $b_3b_2b_1b_0=0110$ represents "Y Y N". Compared with the independent encoding scheme in case 1, in joint encoding, when the maximum quantity of aggregated slots is 3, only four bits may be required to represent all combinations of the quantity of aggregated slots and the use flag information of the flexible resources in the aggregated slots, which requires one less bit than that in the independent encoding scheme. Four-bit information is decoded each time, and whether a flexible resource in a slot corresponding to a bit is used is determined according to the mapping relationship in Table 2. However, in the independent encoding scheme, whether to decode one bit, two bits, or three bits is determined according to the aggregated slot quantity information.

TABLE 2

| Quantity of aggregated slots | Whether flexible resources of aggregated slots are used | | | Use flag information $b_3b_2b_1b_0$ of flexible resources of aggregated slots |
|---|---|---|---|---|
| | 1 | 2 | 3 | |
| 1 | Y | N/A | N/A | 0000 |
| | N | N/A | N/A | 0001 |
| 2 | Y | Y | N/A | 0010 |
| | Y | N | N/A | 0011 |
| | N | Y | N/A | 0100 |
| | N | N | N/A | 0101 |

TABLE 2-continued

| Quantity of aggregated slots | Whether flexible resources of aggregated slots are used | | | Use flag information $b_3b_2b_1b_0$ of flexible resources of aggregated slots |
|---|---|---|---|---|
| | 1 | 2 | 3 | |
| 3 | Y | Y | Y | 0110 |
| | Y | Y | N | 0111 |
| | Y | N | Y | 1000 |
| | Y | N | N | 1001 |
| | N | Y | Y | 1010 |
| | N | Y | N | 1011 |
| | N | N | Y | 1100 |
| | N | N | N | 1101 |

Case 3. Use configuration statuses of the plurality of flexible resources are all enabled, and independent encoding is applied on aggregated slot quantity information and use flag information. As shown in Table 3, $a_1a_0$ is used to represent the aggregated slot quantity information, and $b_0$ is used to represent the use flag information. When the quantity of aggregated slots is 1, namely, in a single-slot case, use of a flexible resource may be enabled or disabled. A configuration manner of the flexible resource is the same as that of a flexible resource of UE that does not support slot aggregation. When the quantity of aggregated slots is greater than or equal to 2, flexible resources in the aggregated slots are all enabled. UL and DL configuration of a flexible resource in each slot is determined according to a direction of scheduling information that is in UE-specific control information and that is used for scheduling the slot. If the scheduling information is UL DCI, the flexible resource is an UL resource. If the scheduling information is DL DCI, the flexible resource is a DL resource. In Table 3, 0 indicates enabled, and 1 indicates disabled. In the embodiments of the present application, 1 may also indicate enabled, and 0 may indicate disabled. This is not limited in the embodiments of the present application.

TABLE 3

| Quantity of aggregated slots | Aggregated slot quantity information $a_1a_0$ | Whether flexible resources of aggregated slots are used | | | Use flag information $b_0$ of flexible resources of aggregated slots |
|---|---|---|---|---|---|
| | | 1 | 2 | 3 | |
| 1 | 00 | Y | N/A | N/A | 0 |
| | | N | N/A | N/A | 1 |
| 2 | 01 | Y | Y | N/A | 0 |
| 3 | 10 | Y | Y | Y | 0 |

Case 4. Use configuration statuses of the plurality of flexible resources are all enabled, and joint encoding is applied on a quantity of aggregated slots and use configuration status of the flexible resources of the aggregated slots. As shown in Table 4, aggregated code is represented by $b_1b_0$. When the quantity of aggregated slots is 1, namely, in a single-slot case, use of a flexible resource may be enabled or disabled. A configuration manner of the flexible resource is the same as that of a flexible resource of UE that does not support slot aggregation. When the quantity of aggregated slots is greater than or equal to 2, flexible resources in the aggregated slots are all enabled. UL and DL configuration of a flexible resource in each slot is determined according to a direction of scheduling information that is in UE-specific control information and that is used for scheduling the slot.

If the scheduling information is UL DCI, the flexible resource is an UL resource. If the scheduling information is DL DCI, the flexible resource is a DL resource. In Table 4, 0 indicates enabled, and 1 indicates disabled. In the embodiments of the present application, 1 may also indicate enabled, and 0 may indicate disabled. This is not limited in the embodiments of the present application.

TABLE 4

| Quantity of aggregated slots | Whether flexible resources of aggregated slots are used | | | Use flag information $b_1b_0$ of flexible resources of aggregated slots |
|---|---|---|---|---|
| | 1 | 2 | 3 | |
| 1 | Y | N/A | N/A | 00 |
|  | N | N/A | N/A | 01 |
| 2 | Y | Y | N/A | 10 |
| 3 | Y | Y | Y | 11 |

Case 5. Use configuration statuses of the plurality of flexible resources are all disabled, and independent encoding is applied on aggregated slot quantity information and use flag information. As shown in Table 5, the aggregated slot quantity information is represented by $a_1a_0$, and the use flag information is represented by $b_0$. When the quantity of aggregated slots is 1, namely, in a single-slot case, use of a flexible resource may be enabled or disabled. A configuration manner of the flexible resource is the same as that of a flexible resource of UE that does not support slot aggregation. When the quantity of aggregated slots is greater than or equal to 2, flexible resources in the aggregated slots are all disabled. In Table 5, 0 indicates enabled, and 1 indicates disabled. In the embodiments of the present application, 1 may also indicate enabled, and 0 may indicate disabled. This is not limited in the embodiments of the present application.

TABLE 5

| Quantity of aggregated slots | Aggregated slot quantity information $a_1a_0$ | Whether flexible resources of aggregated slots are used | | | Use flag information $b_0$ of flexible resources of aggregated slots |
|---|---|---|---|---|---|
| | | 1 | 2 | 3 | |
| 1 | 00 | Y | N/A | N/A | 0 |
|  |  | N | N/A | N/A | 1 |
| 2 | 01 | N | N | N/A | 1 |
| 3 | 10 | N | N | N | 1 |

Case 6. Use configuration statuses of the plurality of flexible resources are all disabled, and joint encoding is applied on a quantity of aggregated slots and use configuration status of the flexible resources of the aggregated slots. As shown in Table 6, aggregated code is represented by $b_1b_0$. When the quantity of aggregated slots is 1, namely, in a single-slot case, use of a flexible resource may be enabled or disabled. A configuration manner of the flexible resource is the same as that of a flexible resource of UE that does not support slot aggregation. When the quantity of aggregated slots is greater than or equal to 2, flexible resources in the aggregated slots are all disabled. In Table 6, 0 indicates enabled, and 1 indicates disabled. In the embodiments of the present application, 1 may also indicate enabled, and 0 may indicate disabled. This is not limited in the embodiments of the present application.

TABLE 6

| Quantity of aggregated slots | Whether flexible resources of aggregated slots are used | | | Use flag information $b_1b_0$ of flexible resources of aggregated slots |
|---|---|---|---|---|
| | 1 | 2 | 3 | |
| 1 | Y | N/A | N/A | 00 |
|  | N | N/A | N/A | 01 |
| 2 | N | N | N/A | 10 |
| 3 | N | N | N | 11 |

Figure 12:
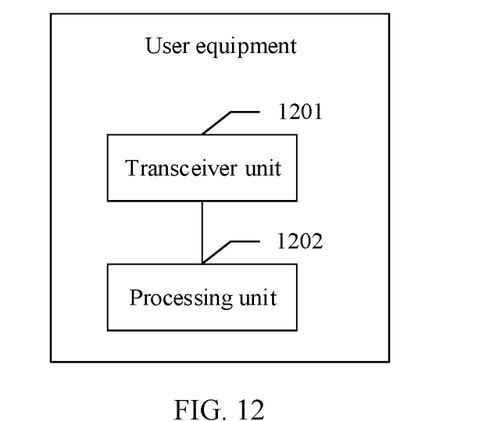
FIG. 12 is a structural diagram of UE according to an embodiment of the present application.

According to a same inventive concept as the method embodiments, an embodiment of this application further provides an apparatus, for example, UE. As shown in FIG. 12, the UE includes: a transceiver unit 1201, configured to receive UE-specific DCI sent by a base station, where the UE-specific DCI is used to indicate a use configuration status of a flexible resource in at least one slot. The processing unit 1202 is configured to configure the flexible resource for the at least one slot according to the use configuration status that is of the at least one slot and that is indicated by the UE-specific DCI received by the transceiver unit 1201.

The UE provided in this embodiment of this application may configure the flexible resource for a slot according to the received UE-specific DCI, and communicate with the base station by using the configured flexible resource, so that slot resource utilization can be improved to some extent.

In one case, when the UE-specific DCI includes use flag information used to indicate the use configuration status, the processing unit may be further configured to: determine the use configuration status according to the use flag information.

In another case, when a time-frequency resource location in which the UE-specific DCI is located is used to indicate the use configuration status, the processing unit may be further configured to: determine the use configuration status according to the time-frequency resource location.

In another case, when the UE-specific DCI is scrambled by using an identifier used to indicate the use configuration status, the processing unit is further configured to: determine the use configuration status according to the identifier.

Optionally, the use configuration status is a use-disabled state; and the processing unit is specifically configured to: configure, according to the use-disabled state, the UE to be prohibited from performing communication by using the flexible resource, where the communication is scheduled by the UE-specific DCI.

Optionally, the use configuration status is a use-enabled state; and the processing unit is specifically configured to: configure, according to the use-enabled state, the UE to perform communication with the base station on the flexible resource, where the communication is scheduled by the UE-specific DCI.

Optionally, the UE-specific DCI includes scheduling information, used to indicate that the flexible resource is an UL resource; and the processing unit is specifically configured to: configure to send, on the flexible resource, UL data to the base station.

Optionally, the UE-specific DCI includes scheduling information, used to indicate that the flexible resource is a DL resource; and the processing unit is specifically configured to: configure to receive, on the flexible resource, DL data from the base station.

Optionally, the processing unit is further configured to: determine, according to a configuration from the base station or a pre-specification in a protocol, that a DL RS exists in the DL resource; and the processing unit is specifically configured to: configure to receive, on the flexible resource, the DL RS from the base station.

Optionally, the processing unit is further configured to: determine a length and a location of a GP in the flexible resource according to the configuration from the base station; and the processing unit is specifically configured to: configure another resource other than the GP in the flexible resource to communicate with the base station.

Optionally, the at least one slot is a plurality of slots in aggregated slots.

Optionally, the plurality of slots are a plurality of consecutive slots.

Optionally, the UE-specific DCI is located in a slot that precedes the plurality of slots in time domain; or the UE-specific DCI is located in a slot that precedes the plurality of slots in time domain.

Optionally, the UE-specific DCI includes aggregated slot quantity information and the use flag information used to indicate the use configuration status; and the use flag information is used to indicate use configuration statuses of all or some slots in the aggregated slots.

Optionally, the UE-specific DCI includes the use flag information used to indicate the use configuration status, and the use flag information may further indicate a quantity of aggregated slots and use configuration statuses of all or some slots in the aggregated slots.

Optionally, the transceiver unit is further configured to: receive higher layer signaling from the base station and the processing unit determines, according to the higher layer signaling, that the aggregating slots is supported; or the transceiver unit is further configured to report, to the base station, capability information indicating that the aggregating slots is supported.

Figure 13:
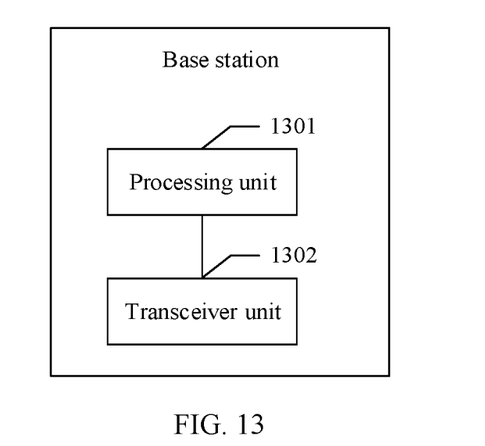
FIG. 13 is a structural diagram of a base station according to an embodiment of this application.

According to a same inventive concept as the method embodiments, this application further provides an apparatus, such as a base station. As shown in FIG. 13, the apparatus includes:

a processing unit 1301, configured to generating unit UE-specific DCI, where the UE-specific DCI is used to indicate a use configuration status of a flexible resource in at least one slot, and the use configuration status is used by UE to configure the flexible resource; and a transceiver unit 1302, configured to send the UE-specific DCI to the UE.

Optionally, the UE-specific DCI includes use flag information used to indicate the use configuration status, and the use flag information is used to determine the use configuration status.

Optionally, a time-frequency resource location in which the UE-specific DCI is located is used to indicate the use configuration status.

Optionally, the UE-specific DCI is scrambled by using an identifier used to indicate the use configuration status; and the identifier is used to determine the use configuration status.

Optionally, the use configuration status is a use-disabled state, and the use-disabled state is used to indicate that the UE is prohibited from performing communication on the flexible resource.

Optionally, the use configuration status is a use-enabled state, and the use-enabled state is used to indicate that the UE is configured to perform communication with a base station on the flexible resource.

Optionally, the UE-specific DCI includes scheduling information, used to indicate that the flexible resource is an UL resource.

Optionally, the UE-specific DCI includes scheduling information, used to indicate that the flexible resource is a DL resource.

Optionally, the processing unit is further configured to determine, according to a configuration or a pre-specification in a protocol, that a DL RS exists in the DL resource; and the transceiver unit is further configured to send the DL RS to the UE on the flexible resource.

Optionally, the transceiver unit is further configured to send configuration information used to determine a length and a location of a GP in the flexible resource, where the configuration information of the GP length and location is used to indicate the UE to configure another resource other than the GP in the flexible resource to communicate with the base station.

Optionally, the at least one slot is a plurality of slots in aggregated slots.

Optionally, the plurality of slots are a plurality of consecutive slots.

Optionally, the UE-specific DCI is located in one slot of the plurality of slots in time domain; or the UE-specific DCI is located in a slot that precedes the plurality of slots in time domain.

Optionally, the UE-specific DCI includes aggregated slot quantity information and the use flag information used to indicate the use configuration status; and the use flag information is used to indicate use configuration statuses of all or some slots in the aggregated slots.

Optionally, the UE-specific DCI includes the use flag information used to indicate the use configuration status, and the use flag information may further indicate a quantity of aggregated slots and use configuration statuses of all or some slots in the aggregated slots.

Optionally, the transceiver unit is further configured to: send higher layer signaling to indicate that the UE supports the aggregating slots; or the transceiver unit is configured to receive capability information that is reported by the UE and indicates that the aggregating slots is supported.

Functional units in the embodiments of this application may be integrated into one processor in a software or hardware manner or exist as various separate physical units, or two or more functional units are integrated into one module. The integrated functional unit may be implemented in a form of hardware, or may be implemented in a form of software.

Figure 14:
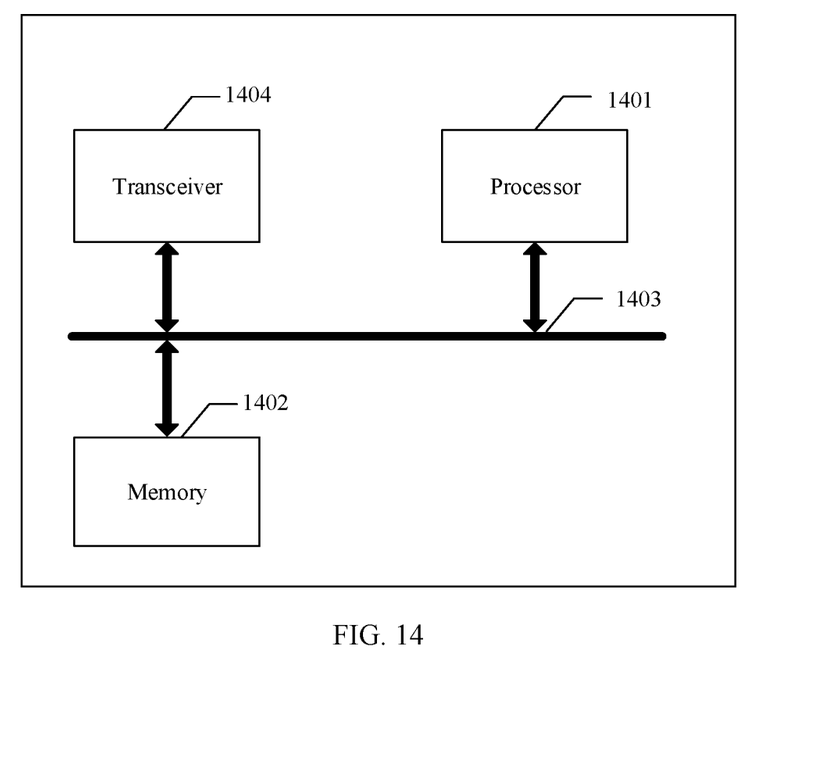
FIG. 14 is a structural diagram of hardware of UE according to an embodiment of the present application.

An embodiment of the present application further provides an apparatus. As shown in FIG. 14, the apparatus may be UE or a base station, and includes a processor 1401. Hardware of an entity corresponding to the processing unit 1202 or 1301 may be the processor 1401. The UE may further include a transceiver 1404, and hardware of an entity corresponding to the transceiver unit 1201 or 1302 may be the transceiver 1404. The processor 1401 may be a central processing unit (CPU), a digital processing unit (DSP), or the like. The apparatus may further include a memory 1402, configured to store a program to be executed by the processor 1401. The memory 1402 may be a non-transitory memory, for example, a hard disk drive (HDD) or a solid-state drive (SSD), or may be a transitory memory, for example, a random-access memory (RAM). The memory 1402 may alternatively be any other medium that can be configured to carry or store expected program code in a form of an instruction or a data structure and that can be accessed by a computer, but is not limited thereto.

The processor 1401 is configured to execute the program code stored in the memory 1402, and specifically invoke a program instruction stored in the memory 1402. When the apparatus is UE, the processor 1401 receives, by using the transceiver 1404, UE-specific DCI sent by a base station. Therefore, the transceiver 1404 is configured to receive, as a specific execution unit, the UE-specific DCI and transfer the UE-specific dedicated DCI to the processor 1401, so that the processor 1401 receives the UE-specific DCI. The UE-specific DCI is used to indicate a use configuration status of a flexible resource in at least one slot. The processor 1401 configures the flexible resource according to the use configuration status. When the apparatus is a base station, the processor 1401 generates the UE-specific DCI, and sends the UE-specific DCI by using the transceiver 1404. Therefore, the transceiver 1404 is configured to send, as a specific execution unit, the UE-specific DCI under control or driving of the processor 1401, to complete sending the UE-specific DCI.

In this embodiment of this application, a specific connection medium between the processor 1401 and the memory 1402 is not limited. In this embodiment of this application, the processor 1401 and the memory 1402 are connected by using a bus 1403 in FIG. 14. The bus is represented by a bold line in FIG. 14. A manner of connection between other components is merely an example for description, and imposes no limitation. The bus may be classified into an address bus, a data bus, a control bus, and the like. For ease of representation, only one thick line is used to represent the bus in FIG. 14, but this does not mean that there is only one bus or only one type of bus.

A person skilled in the art should understand that the embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (apparatus), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer-readable memory that can indicate the computer or another programmable data processing device to work in a specific manner, so that the instructions stored in the computer-readable memory form an instruction apparatus. The instruction apparatus implements a specific function in one or more processes in the flowcharts and/or in one or more blocks in the block diagrams.

It is clear that a person skilled in the art can make various modifications and variations to the embodiments of this application without departing from the spirit and scope of the embodiments of this application. This application is also intended to cover these modifications and variations to embodiments of this application provided that they fall within the scope of protection defined by the following claims and their equivalent technologies.

What is claimed is:

1. An apparatus comprising:
a non-transitory memory storage comprising instructions; and
one or more processors coupled with the memory storage, wherein the one or more processors are configured to execute the instructions to cause the apparatus to:
receive user equipment-specific downlink control information (UE-specific DCI) from a base station, wherein the UE-specific DCI comprises use flag information that indicates a use configuration status of a flexible resource in at least one slot,
wherein the flexible resource is dynamically configured for uplink or downlink transmission, and
wherein the use configuration status is a use-disabled state; and
prohibit communication using the flexible resource according to the use-disabled state, wherein the communication is scheduled by the UE-specific DCI.

2. The apparatus according to claim 1, wherein the one or more processors are further configured to execute the instructions to cause the apparatus to: obtain the use configuration status according to the use flag information.

3. The apparatus according to claim 1, wherein the one or more processors are further configured to execute the instructions to cause the apparatus to:
upon the UE-specific DCI being used to schedule data of a service and the use configuration status of the flexible resource being disabled for the service, prohibit the data of the service from being transmitted on the flexible resource, while permitting transmission on the flexible resource of data of another service scheduled by another piece of UE-specific DCI.

4. The apparatus according to claim 3, wherein the service is one of an enhanced mobile broadband (eMBB) service and an ultra-reliable low-latency communication (URLLC) service.

5. The apparatus according to claim 1, wherein the one or more processors are further configured to execute the instructions to cause the apparatus to:
upon the use configuration status of the flexible resource being disabled, prohibit transmission on the flexible resource of data associated with any service scheduled by the UE-specific DCI, while permitting sending or receiving of a reference signal on the flexible resource.

6. An apparatus comprising:
a non-transitory memory storage comprising instructions; and
one or more processors coupled with the memory storage, wherein the one or more processors are configured to execute the instructions to cause the apparatus to:
generate user equipment-specific downlink control information (UE-specific DCI), wherein the UE-specific DCI comprises use flag information that indicates a use configuration status of a flexible resource in at least one slot,
wherein the flexible resource is dynamically configured for uplink or downlink transmission; and send the UE-specific DCI to user equipment, wherein the use configuration status is a use-disabled state for indicating a specific user equipment to prohibit communication using the flexible resource, and wherein the communication is scheduled by the UE-specific DCI.

7. The apparatus according to claim 6, wherein the one or more processors are further configured to execute the instructions to cause the apparatus to:

upon the UE-specific DCI being used to schedule data of a service and the use configuration status of the flexible resource being disabled for the service, prohibit the data of the service from being transmitted on the flexible resource, while permitting transmission on the flexible resource of data of another service scheduled by another piece of UE-specific DCI.

8. The apparatus according to claim 7, wherein the service is one of an enhanced mobile broadband (eMBB) service and an ultra-reliable low-latency communication (URLLC) service.

9. The apparatus according to claim 6, wherein the one or more processors are further configured to execute the instructions to cause the apparatus to:

upon the use configuration status of the flexible resource being disabled, prohibit transmission on the flexible resource of data associated with any service scheduled by the UE-specific DCI, while permitting sending or receiving of a reference signal on the flexible resource.

10. A slot resource configuration method in wireless communication, the method comprising:

receiving user equipment-specific downlink control information (UE-specific DCI) from a base station, wherein the UE-specific DCI comprises use flag information that indicates a use configuration status of a flexible resource in at least one slot, wherein the flexible resource is dynamically configured for uplink or downlink transmission, and wherein the use configuration status is a use-disabled state; and prohibiting communication using the flexible resource according to the use-disabled state, wherein the communication is scheduled by the UE-specific DCI.

11. The method according to claim 10, wherein the method further comprises obtaining the use configuration status according to the use flag information.

12. The method according to claim 10, further comprising:

upon the UE-specific DCI being used to schedule data of a service and the use configuration status of the flexible resource being disabled for the service, prohibiting the data of the service from being transmitted on the flexible resource, while permitting transmission on the flexible resource of data of another service scheduled by another piece of UE-specific DCI.

13. The method according to claim 10, wherein the service is one of an enhanced mobile broadband (eMBB) service and an ultra-reliable low-latency communication (URLLC) service.

14. The method according to claim 10, further comprising:

upon the use configuration status of the flexible resource being disabled, prohibiting transmission on the flexible resource of data associated with any service scheduled by the UE-specific DCI, while permitting sending or receiving of a reference signal on the flexible resource.

* * * * *